Oct. 24, 1944. S. F. GOOD 2,361,283
PROCESS FOR SEPARATING SUSPENSIONS IN LIQUIDS
Filed Oct. 7, 1941
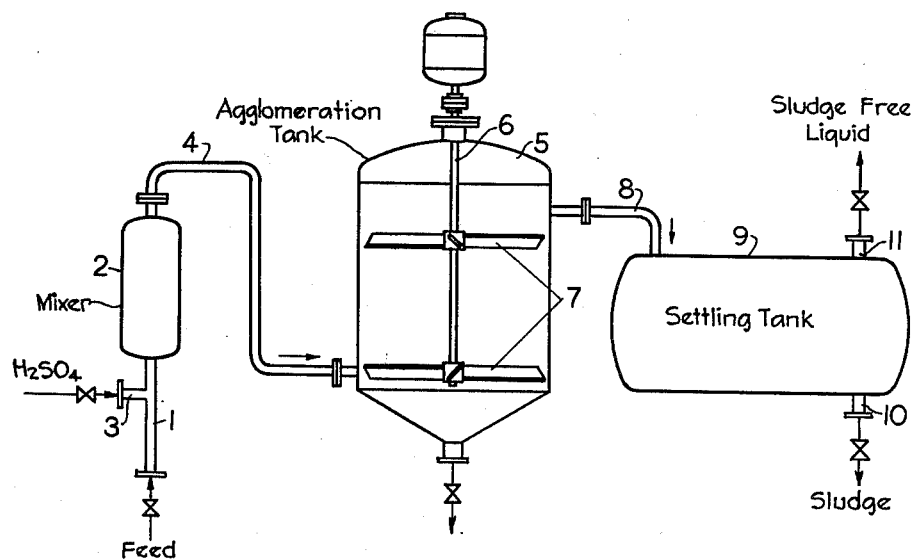
Inventor: Samuel F. Good
By his Attorney:

Patented Oct. 24, 1944

2,361,283

UNITED STATES PATENT OFFICE 2,361,283

PROCESS FOR SEPARATING SUSPENSIONS IN LIQUIDS

Samuel F. Good, Houston, Tex., assignor to Shell Development Company, San Francisco, Calif., a corporation of Delaware Application October 7, 1941, Serial No. 413,979

12 Claims. (Cl. 196—39)

This invention relates to a simple and effective method for removing suspended matter from liquids, which method is particularly applicable to the separation of suspensoids which are of a tacky nature and possess a specific gravity substantially higher than that of the suspending liquid, such as pepper sludges formed in the treatment of hydrocarbon oils with sulfuric acid.

In many industrial processes in which liquids are treated with other liquids or solvents under conditions to form two phases, it frequently happens that suspensions of the one phase and the other phase are formed, which suspensions may be difficult to separate. Typical examples of such suspensions are the pepper sludges which are often formed when treating hydrocarbon oils with 66° Bé. or stronger sulfuric acid; or the carry-over of aqueous caustic alkali when treating hydrocarbon oils therewith; or the suspensions of lead sulfide when plumbite sweetening sour hydrocarbon oils, etc.; or the suspensions of powdered clay in various organic liquids which have been decolorized with the clays, etc.

Means heretofore employed for effecting the separation of such suspensions included settling over long periods of time, centrifuging, filtering, coagulating by passage through relatively coarse filter beds, etc. However, there are certain disadvantages connected with each of these methods. Thus, settling, if workable, usually requires very large settling space and considerable periods of time; centrifuges are expensive, have relatively low capacities, and in practice are usually limited to the separation of liquid suspensoids; filtering, too, is expensive, because of the necessity of cleaning the filters; and coagulation is often insufficient and frequently results in clogged coagulators.

My method is inexpensive, useful where large volumes are involved and is applicable in particular to the breaking of suspensoids of viscous, i. e. semi-liquid or semi-solid consistency, which type of suspensoids has in the past presented particular difficulties. It is of advantage in the coagulation of finely divided acid sludge particles so that the sludge may separate by settling in a much shorter time with much less settling capacity. It is also possible by my process to remove in a relatively short time "pepper" sludge or other suspended material which normally cannot be removed by settling alone. Another advantage when used in connection with acid treating is that the sludge acid is maintained in contact with the oil for a prolonged period of time, and the solvent action of the sludge for certain undesirable compounds in the oil is utilized to the fullest extent.

My method consists essentially of passing a liquid suspension of the type described through a stationary, vertical, cylindrical time tank, and while passing it through this tank, rotating the body of the liquid contained therein at a speed as high as possible without causing material turbulent flow, except along the walls of the tank where there may be a narrow band of turbulent flow. The purpose of the treatment is to expose the suspension to a moderate motion, causing internal slip streams in various directions so that the suspended particles collide with each other to form larger particles. The resulting material comprising the larger agglomerated particles is removed to a horizontal settler where separation of the sludge is now easily effected, to result in a treated liquid substantially free from suspended material.

My process is advantageous for coagulating finely divided suspended material from liquids, and applies to most suspensions regardless of the properties of the liquid and of the suspended material, provided that the suspension is of such a nature that small suspended particles will be coagulated by contact with each other or will stick to relatively large particles when colliding therewith. Thus, the process is particularly useful when the suspended material is tacky and highly viscous and may be applied in the coagulation of finely divided sludges produced by treatment of many organic liquids with various strong inorganic oxy acids, e. g. sulfuric acid, phosphoric acid, etc.; or with Friedel Crafts catalysts such as the halides of aluminum, boron, iron, tin, antimony, bismuth, arsenic, molybdenum, tungsten, vanadium, titanium, thorium and zirconium. Among the organic liquids which are treated with agents of the above type to produce sludges are, for example: hydrocarbon oils, such as gasoline, kerosene, gas oil, lubricating oil, benzene, toluene, xylenes, etc.; halogenated hydrocarbons, such as ethylene dichloride, chlorpropane, dichlorpropane, chlorinated butanes, corresponding bromine or iodine derivatives, halogenated higher hydrocarbons, etc.; various ethers; fatty oils; fatty acids; etc. Further it may be useful to remove suspensoids formed in treating hydrocarbon oils with aqueous caustic alkali, or the suspensions of lead sulfide in plumbite sweetening sour hydrocarbon oils by the so-called "doctor treatment."

Under proper operating conditions all particles, whatever the nature, from the coarsest to those of semi-colloidal dimensions, will be coagulated and removed, provided that the suspension is of a type (as explained above) that can be coagulated by the process.

Factors affecting the efficiency of my separating method include time and the magnitude of the motion. As indicated earlier, the movement of the liquid in the tank should be such to avoid unnecessary turbulent flow, because the latter tends to break up suspended particles or at least to prevent the formation of aggregates of suspended particles, such aggregates being important for the success of the operation. On the other hand, the maximum rotational speed which still permits the formation of aggregates is the most desirable because it permits the greatest number of slip streams resulting in the greatest number of collisions of suspended particles.

The maximum degree of turbulence which can be tolerated depends to a great extent on the nature of the suspended material. If the suspensoid emulsifies readily or if the particles are prevented from joining by strong electrical charges, even a slight turbulence is detrimental. In such cases, simple collision of particles may be insufficient to result in formation of agglomerates and to give a significant separation. Such a situation may arise in the case of stabilized emulsions. On the other hand, if unfavorable surface tension and electrical forces causing re-emulsification are absent, then the suspensoid is of such a nature that it can be coagulated by collision of suspended particles, and consequently a greater degree of turbulence can be tolerated. Accordingly, if the suspension is stabilized as by the presence of emulsifier or strong electrical charges of the suspended particles, it may be desirable or essential to remove the emulsifier or reduce these charges at least in part before subjecting the suspension to my treatment. For example, crude petroleum oils containing emulsified water should first be treated with a suitable emulsion breaker. Other treatments may comprise addition of oppositely charged colloids, electrical means for causing the discharge of the particles, etc.

In order to increase the chances for collision of the particles, it is often desirable to impart to the body of liquid a moderate movement other than the rotational one. Thus, in addition, it may be given an up and down movement, such as is explained in more detail in connection with the drawing.

As stated, the time of the treatment affects the completeness of the separation. The longer the time, the more complete the separation. Therefore, it is desirable to employ relatively large tanks for carrying out the treatment. Tanks of large diameters have the further advantage of permitting high peripheral velocities without causing excessive turbulence. Thus, the treatment is particularly applicable to large scale performance, where the volumes of suspensions to be handled run perhaps into thousands of barrels per day. This is in great contrast to most other separating processes in which the difficulties normally increase with the throughput, thereby limiting the size of equipment and the amount of material which can be handled by it.

The rotational movement is most conveniently imparted to the liquid by conventional paddle stirrers which, in addition, may have a slight twist so as to give a slight propeller action causing up and down movement. In practice, it has been found advantageous to use two of such paddle stirrers, axially disposed within the mixing tank, one above the other, the upper having a pitch such that the liquid is propelled downward, and the lower having a pitch such that the liquid is forced upward.

The velocity of rotation, though substantially independent of the size of the apparatus, should be controlled within certain limits. Suitable velocities in most plant size equipment will be found to be between 30 and 80 R. P. M. In smaller size equipment, such as laboratory or semi-plant scale equipment, higher velocities may be employed, say up to 150 or 200 R. P. M. However, care should be taken to avoid repeptization, which will occur if the velocity of rotation is too great.

The process is illustrated in the accompanying drawing which represents a simplified flow diagram of a preferred form of my process in which, for example, a gas oil is treated with sulfuric acid whereby pepper sludge is formed.

For simplicity, the drawing does not show pumps, heat exchangers, by-passes, vents, reboilers, and other auxiliaries, the proper placement of which will be evident to those skilled in the art.

During operation, gas oil enters a Duriron or other similar mixing device 2 through line 1 where it is mixed with sulfuric acid entering mixer 2 through line 3. Gas oil containing suspended sulfuric acid sludge passes from mixer 2 through line 4 to a point of entry near the bottom of agglomeration tank 5, provided with an axially disposed stirrer mechanism 6 comprising paddles 7. In the case of sulfuric acid treatment of hydrocarbon oils, the treating reaction is normally substantially complete when the mixture enters tank 5, and thus passage through the tank serves only for coagulation of finely divided sludge particles. However, in other treating processes, the reaction may not be complete at the point of entry to the tank, and the passage through the tank may serve not only to effect coagulation but also to provide time for the completion of the reaction.

After being subjected for a time to the rotational motion of stirrer mechanism 7 in tank 5, the mixture then overflows through line 8 through which it is conveyed to streamlined settling tank 9. In settling tank 9, sludge particles which are relatively large and agglomerated due to the treatment in tank 5 rapidly settle and are removed through line 10, and the treated gas oil, comparatively free from sludge, is withdrawn through line 11.

The following example will serve to illustrate the effectiveness of my process.

*Example*

When passing sulfuric acid treated, cracked gas oil directly from a mixer to streamlined settler, suspended sulfuric acid sludge equivalent to 0.13 lb. of sulfuric acid per barrel was retained after settling. However, when conveying the same oil under the same conditions from the mixer through a coagulating tank 10 feet in diameter and 12 feet high with an approximate capacity of 160 barrels and containing two axially disposed paddles located about 6 feet apart, said blades being 3 feet long and 18 inches wide and rotated at 65–70 R. P. M., and thence to the settler, the amount of sludge retained was equivalent to only .03 lb. of sulfuric acid per barrel. The residence time of the tank was about 30 minutes.

I claim as my invention:

1. A method for separating a mixture of a liquid containing finely divided particles dispersed therein, said particles being capable of adhering to each other upon collision, comprising subjecting said mixture in a cylindrical treating zone to a motion which is rotational and simultaneously longitudinal in opposite directions of the type obtained by means of rotating mixing blades of opposite pitch located in said cylindrical treating zone whereby said particles collide and form agglomerates, said rotational motion being between 30 and 80 R. P. M. and insufficient to cause disintegration of said agglomerates, and settling the resulting mixture whereby said agglomerates are removed from said liquid.

2. The method of claim 1 wherein the finely divided particles are tacky and viscous.

3. A method for separating a mixture of an organic liquid containing particles of finely divided sludge dispersed therein, said sludge being an oxy acid, comprising subjecting said mixture in a cylindrical treating zone to a motion which is rotational and simultaneously longitudinal in opposite directions of the type obtained by means of rotating mixing blades of opposite pitch located in said cylindrical treating zone whereby said sludge particles collide and form agglomerates, said rotational motion being between 30 and 80 R. P. M. and insufficient to cause disintegration of said agglomerates, and settling the resulting mixture whereby said sludge is removed from said liquid.

4. The method of claim 3 wherein said sludge is a sulfuric acid sludge.

5. The method of claim 3 wherein said sludge is an aluminum chloride sludge.

6. The method of claim 3 wherein said organic liquid is a hydrocarbon liquid.

7. In a process for treating an organic liquid with a treating agent therefor which agent in contact with said organic liquid produces a tacky sludge tending to be finely dispersed, the steps comprising mixing said organic liquid with said agent under conditions to effect said treatment and to produce said sludge at least a portion of which is in the form of finely divided particles, subjecting the resulting mixture in a cylindrical treating zone to a motion which is rotational and simultaneously longitudinal in opposite directions of the type obtained by means of rotating mixing blades of opposite pitch located in said cylindrical treating zone whereby said particles collide and form agglomerates, said rotational motion being between 30 and 80 R. P. M. and insufficient to cause disintegration of said agglomerates, and settling the resulting mixture whereby said sludge is removed from said liquid.

8. In a process for treating an organic liquid with a treating agent therefor which agent in contact with said organic liquid produces a tacky sludge tending to be finely dispersed, the steps comprising mixing said organic liquid with said agent under conditions substantially to complete said treatment and to produce said sludge at least a portion of which is in the form of finely divided particles, subjecting the resulting mixture in a cylindrical treating zone to a motion which is rotational and simultaneously longitudinal in opposite directions of the type obtained by means of rotating mixing blades of opposite pitch located in said cylindrical treating zone whereby said particles collide and form agglomerates, said rotational motion being between 30 and 80 R. P. M. and insufficient to cause disintegration of said agglomerates, and settling the resulting mixture whereby said sludge is removed from said liquid.

9. In a process for treating a liquid hydrocarbon mixture with a Friedel Crafts catalyst, the steps comprising mixing said hydrocarbon liquid with said agent under conditions to effect said treatment and to produce sludge at least a portion of which is in the form of finely divided particles, subjecting the resulting mixtures in a cylindrical treating zone to a motion which is rotational and simultaneously longitudinal in opposite directions of the type obtained by means of rotating mixing blades of opposite pitch located in said cylindrical treating zone whereby said particles collide and form agglomerates, said rotational motion being between 30 and 80 R. P. M. and insufficient to cause disintegration of said agglomerates, and settling the resulting mixture whereby said sludge is removed from said liquid.

10. A method for separating a mixture of an organic liquid containing particles of finely divided sludge dispersed therein, said sludge being a Friedel Crafts catalyst sludge, comprising subjecting said mixture in a cylindrical treating zone to a motion which is rotational and simultaneously longitudinal in opposite directions of the type obtained by means of rotating mixing blades of opposite pitch located in said cylindrical treating zone whereby said sludge particles collide and form agglomerates, said rotational motion being between 30 to 80 R. P. M. and insufficient to cause disintegration of said agglomerates, and settling the resulting mixture whereby said sludge is removed from said liquid.

11. The process of claim 10 wherein said organic liquid is a hydrocarbon liquid.

12. In a process for treating a liquid hydrocarbon mixture with a strong oxy acid, the steps comprising mixing said hydrocarbon liquid with said acid under conditions to effect said treatment and to produce sludge, at least a portion of which is in the form of finely divided particles, subjecting the resulting mixture in a cylindrical treating zone to a motion which is rotational and simultaneously longitudinal in opposite directions of the type obtained by means of rotating mixing blades of opposite pitch located in said cylindrical treating zone whereby said particles collide and form agglomerates, said rotational motion being between 30 and 80 R. P. M. and insufficient to cause disintegration of said agglomerates, and settling the resulting mixture whereby said sludge is removed from said liquid.

SAMUEL F. GOOD.

Certificate of Correction

Patent No. 2,361,283.                                                October 24, 1944.

SAMUEL F. GOOD

It is hereby certified that error appears in the printed specification of the above numbered patent requiring correction as follows: Page 3, first column, line 39, for the claim reference numeral "3" read *10*; and that the said Letters Patent should be read with this correction therein that the same may conform to the record of the case in the Patent Office.

Signed and sealed this 28th day of October, A. D. 1947.

[SEAL]

THOMAS F. MURPHY,
*Assistant Commissioner of Patents.*